(12) United States Patent
Ohlsson et al.

(10) Patent No.: US 10,975,548 B2
(45) Date of Patent: Apr. 13, 2021

(54) WHEEL LOADER FRONT UNIT AND A WHEEL LOADER

(71) Applicant: VOLVO CONSTRUCTION EQUIPMENT AB, Eskilstuna (SE)

(72) Inventors: Johan Ohlsson, Katrineholm (SE); Norbert Rosenpek, Växjö (SE)

(73) Assignee: Volvo Construction Equipment AB, Eskilstuna (SE)

( * ) Notice: Subject to any disclaimer, the term of this patent is extended or adjusted under 35 U.S.C. 154(b) by 350 days.

(21) Appl. No.: 16/084,831

(22) PCT Filed: Mar. 24, 2016

(86) PCT No.: PCT/SE2016/050251
§ 371 (c)(1),
(2) Date: Sep. 13, 2018

(87) PCT Pub. No.: WO2017/164786
PCT Pub. Date: Sep. 28, 2017

(65) Prior Publication Data
US 2019/0071843 A1 Mar. 7, 2019

(51) Int. Cl.
*E02F 9/08* (2006.01)
*E02F 3/627* (2006.01)
(Continued)

(52) U.S. Cl.
CPC .......... *E02F 9/0841* (2013.01); *B62D 21/186* (2013.01); *E02F 3/283* (2013.01);
(Continued)

(58) Field of Classification Search
CPC ............ E02F 9/0841; E02F 3/283; E02F 9/22
See application file for complete search history.

(56) References Cited

U.S. PATENT DOCUMENTS 3,123,222 A * 3/1964 Livingston .............. B66C 23/78
212/261
3,337,974 A 8/1967 Fisher
(Continued)

FOREIGN PATENT DOCUMENTS

CN 101842536 A 9/2010
CN 103052753 A 4/2013
(Continued)

OTHER PUBLICATIONS

Extended European Search Report dated Oct. 24, 2019 for European Patent Application No. 16895641.5, 5 pages.
(Continued)

*Primary Examiner* — Michael S Lowe
(74) *Attorney, Agent, or Firm* — Sage Patent Group

(57) ABSTRACT

A wheel loader front unit includes a frame for a wheel loader, the frame including an upper joint element and a lower joint element for connecting the frame to a rear unit of the wheel loader, and for transferring loads between the frame and the rear unit, the frame including a lift arm mounting point for a pivot connection of the frame and a lift arm for lifting an implement of the wheel loader. The upper and lower joint elements are arranged so that a first of the upper and lower joint elements, during use of the wheel loader, transfers a larger vertical load than a second of the upper and lower joint elements, and the lift arm mounting point is located closer to the first of the upper and lower joint elements than to the second of the upper and lower joint elements.

18 Claims, 7 Drawing Sheets

(51) Int. Cl.
*B62D 21/18* (2006.01)
*E02F 3/28* (2006.01)
*E02F 9/02* (2006.01)
*E02F 9/22* (2006.01)
*B60K 7/00* (2006.01)

(52) U.S. Cl.
CPC ............... *E02F 3/627* (2013.01); *E02F 9/02* (2013.01); *E02F 9/22* (2013.01); *B60K 7/0007* (2013.01)

(56) References Cited

U.S. PATENT DOCUMENTS

| | | |
|---|---|---|
| 3,590,929 A | 7/1971 | Wirt |
| 3,806,159 A | 4/1974 | Casey |
| 3,888,372 A | 6/1975 | Gorby et al. |
| 4,349,307 A | 9/1982 | Klem |
| 5,366,299 A | 11/1994 | Hughes |
| 5,984,618 A | 11/1999 | Deneve et al. |
| 6,168,368 B1 | 1/2001 | Apgar et al. |
| 7,736,117 B2 | 6/2010 | Harshberger et al. |
| 8,950,774 B2 | 2/2015 | Ushikibo et al. |
| 10,344,449 B2 * | 7/2019 | Wagner ................. E02F 9/0841 |
| 10,815,642 B2 * | 10/2020 | Ohlsson ................. E02F 9/0808 |
| 2003/0070329 A1 | 4/2003 | Wagner et al. |
| 2005/0087386 A1 | 4/2005 | Hennemann et al. |
| 2013/0313806 A1 | 11/2013 | Hansen et al. |

FOREIGN PATENT DOCUMENTS

| | | |
|---|---|---|
| GB | 2333762 A | 8/1999 |
| JP | H11158936 A | 6/1999 |
| RU | 2068058 C1 | 10/1996 |
| WO | 2014054983 A1 | 4/2014 |
| WO | 2014098652 A1 | 6/2014 |

OTHER PUBLICATIONS

International search Report (dated Dec. 22, 2016) for corresponding International App. PCT/SE2016/050251.

Chinese First Office Action dated Sep. 21, 2020 for Chinese Patent Application No. 201680083926.9, 23 pages (including English translation).

\* cited by examiner

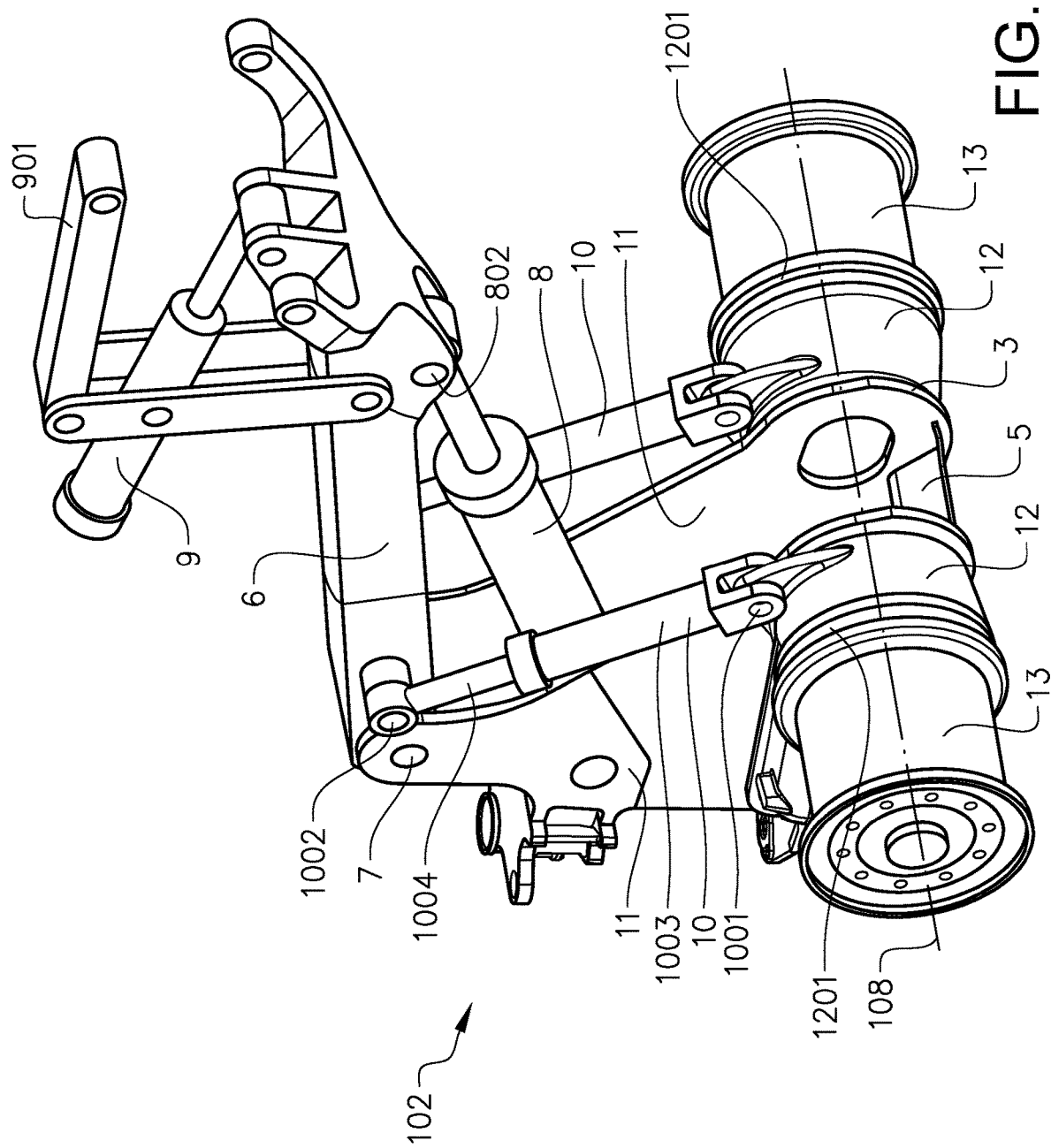

WHEEL LOADER FRONT UNIT AND A WHEEL LOADER

BACKGROUND AND SUMMARY

The invention relates to a wheel loader front unit, and a wheel loader. The invention is applicable on working machines within the fields of industrial construction machines or construction equipment, in particular wheel loaders.

A working machine, such as a wheel loader, is usually provided with a bucket, container, gripper or other type of implement for digging, carrying and/or transporting a load. For example, a wheel loader has a lift arm unit for raising and lowering the implement. Usually a hydraulic cylinder or a pair of hydraulic cylinders is arranged for raising the lift arm and a further hydraulic cylinder is arranged for tilting the implement relative to the lift arm.

In addition, the working machine is often articulated frame-steered and has a pair of hydraulic cylinders for turning or steering the working machine by pivoting a front unit and a rear unit of the working machine relative to each other. The hydraulic system generally further comprises at least one hydraulic pump, which is arranged to supply hydraulic power, i.e. hydraulic flow and/or hydraulic pressure, to the hydraulic cylinders.

An articulated frame-steered wheel loader will normally be subjected to high loads during operation. To withstand such loads, the amount of material in the structure of the wheel loader may be generously provided, which will result in a relatively heavy wheel loader. A large wheel loader mass will in turn result in an increased fuel consumption as well as increased production costs.

There is therefore a desire to reduce the weight, of wheel loaders while retaining their capacity to withstand high loads to which they are subjected during their lifetime.

It is desirable to provide a wheel loader in which the weight is reduced.

According to an aspect of the invention a wheel loader front unit is provided comprising a frame for a wheel loader.

the frame comprising an upper joint element and a lower joint element for connecting the frame to a rear unit of the wheel loader, and for transferring loads between the frame and the rear unit, the frame comprising a lift arm mounting point for a pivot connection of the frame and a lift arm for lifting an implement of the wheel loader, characterized in that the upper and lower joint elements are arranged so that a first of the upper and lower joint elements, during use of the wheel loader, transfers a larger vertical load than a second of the upper and lower joint elements, and that the lift arm mounting point is located closer to the first of the upper and lower joint elements than to the second of the upper and lower joint elements.

It is understood that the upper and lower joint elements may connect the frame to the rear unit so as to allow the front and rear units to pivot in relation to each other around a substantially vertical axis, when the wheel loader is supported on a horizontal surface.

The upper and lower joint elements are preferably arranged so that the first of the upper and lower joint elements transfers at any instance during use a larger vertical load than the second of the upper and lower joint elements. Since the lift arm mounting point is located closer to the first of the upper and lower joint elements than to the second of the upper and lower joint elements, the lift arm mounting point may be located in the vicinity of the first of the upper and lower joint elements. Thereby a short load path will be provided in the frame between the load arm mounting point and the joint element transferring the larger vertical load. This will provide a possibility of reducing the amount of material in the frame, and to thereby reduce the weight of the frame. In addition, the reduction of material will reduce the cost of producing the frame.

Preferably, the upper and lower joint elements are arranged so that the first of the upper and lower joint elements, during use of the wheel loader, transfers substantially the entire vertical load between the frame and the rear unit. The combination of the short load path between the load arm mourning point and the first joint element, and substantially the entire vertical load being transferred through the first joint element, provides particularly beneficial possibilities to reduce the material in the frame.

Preferably, where the frame comprises an actuator mounting point for a pivot connection of the frame and an actuator for the lift arm, the actuator mounting point is located closer to the first of the upper and lower joint elements than to the second of the upper and lower joint elements. Thereby a short load path will be provided in the frame between the actuator mounting point and the joint element transferring the larger vertical load. This will provide a further contribution to possibilities of reducing the amount of material in the frame, and to thereby reduce the weight of the frame.

Preferably, the upper joint element is the first of the upper and lower joint elements and the lower joint element is the second of the upper and lower joint elements. Thus, the upper joint element transfers, during use of the wheel loader, the larger vertical load than the lower joint element. This is particularly beneficial where the wheel loader front unit comprises the lift arm and an actuator for pivoting the lift arm around a horizontal axis at the lift arm mounting point, and a frame end of the actuator, which is connected to the frame at an actuator mounting point, is situated higher than a lift arm end of the actuator, which is connected to the lift arm, when the wheel loader front unit forms a part of a wheel loader and the lift arm is situated in its lowest position. Where the actuator is a hydraulic cylinder, said arrangement is a so called high-mount position of the hydraulic cylinder. Thus, a combination of such a high-mount position of the hydraulic cylinder, and the larger vertical load being transferred via the upper joint element, may provide a particularly short load path of vertical loads from the actuator mounting point to the upper joint element.

It is understood that the lift arm may be arranged to pivot in relation to the frame around a substantially horizontal axis when the wheel loader is supported on a horizontal surface. The front unit may present only a single lift arm, i.e. a so called single boom assembly.

Preferably, where the upper and lower joint elements are arranged to connect the frame to the rear unit so as to allow the front and rear units to pivot in relation to each other around a substantially vertical axis when the wheel loader is supported on a horizontal surface, the first of the upper and lower joint elements is arranged to transfer vertical as well as horizontal loads. Further the second of the upper and lower joint elements is preferably arranged to transfer only horizontal loads. For this, the second of the upper and lower joint elements may comprise a cylindrical body connectable to one of the frame and rear unit, with a cylinder axis arranged to be coaxial with said substantially vertical axis, and an ear connectable to the other of the frame and rear unit, arranged to circumvent the cylindrical body, wherein the second of the upper and lower joint elements is arranged to allow the ear to move in relation to the cylindrical body along the cylinder axis of the cylindrical body. Thereby, it is secured that the second of the upper and lower joint elements will not transfer any substantial portion of the vertical load between the front and rear units, and that substantially the entire vertical load is transferred through the first of the upper and lower joint elements.

Advantageously, the wheel loader front unit comprises two hub supporting elements, each hub supporting element being arranged on opposite sides outside of the frame for supporting a respective hub unit, the wheel loader front unit comprising the lift arm, the lift arm being arranged to be pivoted around the pivot connection to the frame by means of a main hydraulic cylinder, the wheel loader front unit further comprising a tilting hydraulic cylinder arranged to actuate a tilting movement of the implement in relation to the lift arm, the wheel loader front unit further comprising a slave hydraulic cylinder hydraulically connected to the tilting hydraulic cylinder for controlling the tilting movement of the implement when the lift arm is pivoted by means of the main hydraulic cylinder, wherein the slave hydraulic cylinder extends between the lift arm and one of the hub supporting elements.

Preferably, the hub units are arranged to support a respective front wheel of the wheel loader. Each front wheel may be supported externally of the respective hub support.

The hydraulic connection between the slave hydraulic cylinder and the tilting hydraulic cylinder may provide for the implement to remain in a single angular position relative to the ground while the lift arm is pivoted by means of the main hydraulic cylinder. Since the hub supporting elements are located outside of the frame, and the slave hydraulic cylinder extends between the lift arm and one of the hub supporting elements, the frame may be relieved of loads taken by the slave hydraulic cylinder. Thus, the slave hydraulic cylinder is arranged to transfer loads from the lift arm towards one of the wheels carried by one of the hub units, without said loads being transferred via the frame.

Embodiments of the invention may provide for the slave hydraulic cylinder to be arranged to transfer forces directly between the lift arm and the hub supporting element. Thus, the frame is advantageously by-passed, whereby the frame does not have to be structurally designed to transfer forces which will instead be carried by the slave hydraulic cylinder. In other words, there is no need to introduce structural parts to the frame in order to manage all loads acting from the lift arm. Some of these loads are transferred to the hub supporting element while by-passing the frame. The hydraulic connection between the slave hydraulic cylinder and the tilting hydraulic cylinder may provide for a load in the implement to cause a pressure in the tilting hydraulic cylinder, in turn causing a pressure in the slave hydraulic cylinder so as to support the lift arm while by-passing the frame. Thereby, the weight of the frame may be further reduced. Combined with the short load path from the lift arm mounting point to the first joint element described above, the direct load transfer from the lift arm to the hub supporting element provides a particularly advantageous load transfer through the front unit, providing substantial opportunities of reducing the weight of the front unit.

The slave hydraulic cylinder may be pivotally connected to the hub supporting element at a first mounting point and to the lift arm at a second mounting point. Where the hub supporting elements define a position of a wheel axis, the first mounting point may be in the vicinity of the wheel axis. The respective hub supporting element may have a circularly shaped interface for mating with the hub unit, whereby the wheel axis extends through the center of the interface. Thereby, the hub supporting elements may define with their design and their position on the frame the position of the front wheel axis. The first mounting point may be located above the wheel axis when the wheel loader front unit, forms a part of a wheel loader and the wheel loader is supported on a horizontal support surface. A ratio between a horizontal distance between the wheel axis and the first mounting point and a horizontal distance between the wheel axis and the pivot connection of the lift arm to the frame is preferably less than 30%, more preferably less than 15%, where the horizontal distances are measured along a longitudinal axis being parallel to a direction of straight travel of the wheel loader when the wheel loader front unit forms a part of the wheel loader. Thereby, the forces transferred by the slave hydraulic cylinder may be advantageously introduced close to the hub unit and a wheel carded by the hub unit.

Where the slave hydraulic cylinder comprises a cylinder portion and a piston portion which are movable in relation to each other along an actuation direction of the slave hydraulic cylinder, advantageously the cylinder portion is pivotally connected to the hub supporting element and the piston portion is pivotally connected to the lift arm.

Preferably, the wheel loader front unit comprises two slave hydraulic cylinders each extending between the lift arm and a respective of the hub supporting elements. Each slave hydraulic cylinder may be pivotally connected to the lift arm on a respective lateral side of the lift arm. Each slave hydraulic cylinder may be pivotally connected to the respective hub supporting element on a lateral side of the lift arm, which is the same as the lateral side on which the respective slave hydraulic cylinder is pivotally connected to the lift arm. Herein a lateral direction is understood as a horizontal direction which is perpendicular to the direction of straight travel of the wheel loader when the wheel loader is supported on a horizontal surface.

Thereby, an advantageous symmetric transfer of loads between the load arm and the hub supporting elements may be provided. The lateral positions of the slave hydraulic cylinders in relation to the lift arm provides for the slave hydraulic cylinders to advantageously extend substantially vertically as projected on a vertical lateral plane.

The frame may comprise two side plates and an intermediate central structure connecting the side plates to each other. Preferably, the side plates are arranged to be located, when the wheel loader front unit forms a part of a wheel loader, laterally of the central structure in relation to a straight direction of travel of the wheel loader. The side plates may extend upwards and/or forwards beyond the central structure. The side plates may be substantially vertical when the wheel loader front unit forms a pan of a wheel loader which is supported on a horizontal surface. The side plates may be arranged adjacent to the central structure. Each hub supporting element may be arranged outside of a respective of the side plates. Each hub supporting element may extend from a respective of the side plates, on a side of the side plate opposite to the central structure. The lift arm may be arranged to be pivotable to a position where at least a major part of the lift arm is positioned between the side plates. Thereby, a simple and robust frame is provided, which will allow a large unobstructed movement of the lift arm, while the frame will not be subjected to loads transferred by the slave hydraulic cylinder.

Preferably, the lift arm is located centrally between the hub supporting elements. Preferably, the main hydraulic cylinder is located centrally between the hub supporting elements. Thereby, a compact and robust design may be provided with a single, centrally located lift arm and a centrally located main hydraulic cylinder, and with slave hydraulic cylinders extending on either side of the lift arm, by-passing the frame.

Preferably, where each hub supporting element supports the respective hub unit, each hub unit comprises a hub motor for propulsion of the wheel loader. Thereby, the invention is advantageously used in a wheel loader without a drivetrain mechanically connecting a central engine to the wheels, i.e. where there is no requirement to extend a cardan shaft past the articulated connection between the front and rear units of the wheel loader.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 2 is a perspective view of a front unit of the wheel loader in FIG. 1.

DETAILED DESCRIPTION

Figure 1:
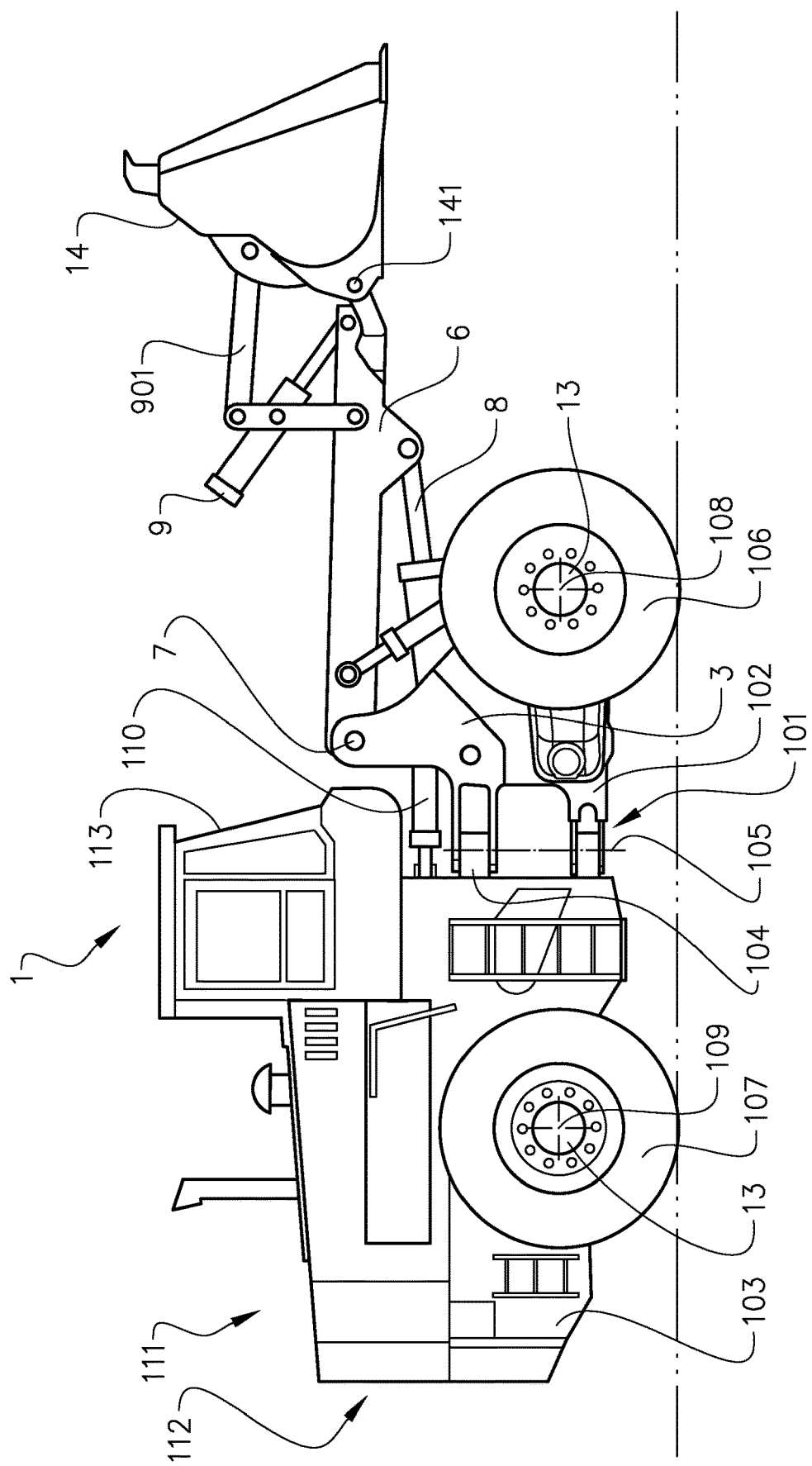
FIG. 1 is a side view of a wheel loader

FIG. 1 is an illustration of a working machine 1 the form of a wheel loader. The wheel loader comprises a body structure 101 with a front unit 102 and a rear unit 103. The front unit 102 comprises a frame 3 described closer below. The front unit 102 and the rear unit 103 are mounted to each other via a pivotable coupling 104 described closer below. The front unit 102 and the rear unit 103 present two front wheels 106 and two rear wheels 107, respectively. The wheels are mounted to respective hub units 13 described closer below. The front wheels 106 define a front wheel axis 108 and the rear wheels 107 define a rear wheel axis 109.

The pivotable coupling 104 is arranged to allow the from and rear units to pivot in relation to each other around a pivot axis 105 which is substantially vertical when the wheel loader 1 is supported on a horizontal surface. Two steering hydraulic cylinders 110 are arranged on opposite sides of the wheel loader 1 for turning the wheel loader by means of relative movement of the front unit 102 and the rear unit 103. In other words, the wheel loader 1 is articulated and frame steered by means of the steering, hydraulic cylinders 110.

The rear unit 103 of the wheel loader 1 comprises an engine compartment 111 with an internal combustion engine and a radiator system 112. The rear unit 103 further comprises a driver compartment 113, herein also referred to as a cab.

The wheel loader 1 has an electric hybrid propulsion system. More specifically, the propulsion system is provided in a series electric hybrid configuration. The internal combustion engine is connected to a generator, in turn connected to an electric storage arrangement in the form of a battery pack. At each wheel 106, 107 an electric propulsion motor and a service brake are provided in the respective hub unit 13. Each torque generating means 13 comprises in addition a braking means 161 of a vehicle brake system.

It should be noted that the invention is applicable to working machines with other types of propulsion systems, e.g. fully electric propulsion systems, or traditional internal combustion engine and drivetrain combinations.

The wheel loader 1 comprises an implement 14. The term "implement" is intended to comprise any kind of tool suitable for a wheel loader, such as a bucket, a fork or a gripping tool. The implement 14 illustrated in FIG. 1 is a bucket. The implement 14 is arranged on an elongated lift arm 6 for lifting and lowering the implement 14 relative to the body structure 101.

The lift arm 6 is at a first end rotatably or pivotally connected to the frame 3 at a first pivot connection 7 at a lift arm mounting point presented by the frame 3. The implement 14 is mounted to the lift arm 6 at a second pivot connection 141 at a second end of the lift arm 6. The lift arm 6 is arranged to be pivoted around the first pivot connection 7 by means of an actuator in the form of a main hydraulic cylinder 8 being part of a hydraulic system of the wheel loader. Thereby the lift arm 6 is pivotable between an upper end position and a lower end position.

The wheel loader also comprises a tilting hydraulic cylinder 9 arranged to actuate a tilting movement of the implement 14 in relation to the lift arm 6. For this the implement 14 is pivotally mourned to the lift arm 6 at the second pivot connection 141. The tilting hydraulic cylinder 9 extends from the lift arm 6 to a linkage mechanism 901, which is adapted to transfer movements from the tilting hydraulic cylinder 9 to the implement 14.

Reference is made to FIG. 2 showing the front unit 102 of the wheel loader. The front unit 102 comprises a frame 3. The frame 3 comprises two side plates 11 and an intermediate central structure 5 connecting the side plates 11 to each other. Thus, the side plates 11 are located laterally of the central structure 5 in relation to a straight direction of travel of the wheel loader. Also, the side plates 11 extend upwards and forwards beyond the central structure 5. The side plates 11 are adjacent to the central structure 5 and connected to it e.g. by welding. The side plates 11 are substantially vertical when the wheel loader is supported on a horizontal surface.

As seen from the front of the wheel loader, the lift arm 6 and the main hydraulic cylinder 8 are located centrally between the side plates 11. Further the main hydraulic cylinder 8 is located below the lift arm 6. The main hydraulic cylinder 8 presents a frame end at which it is pivotally connected to the frame 3, and a lift a end 802 at which it is pivotally connected to the lift arm 6. The frame end of the main hydraulic cylinder 8 is pivotably connected to the side plates 11 of the frame 3. The first pivot connection 7 connects the lift arm 6 to the side plates 11 of the frame 3. More specifically, each side plate 11 may present an ear 1101 at an upper end of the respective side plate 11. The first end of lift arm 6 is located between the side plate ears. Thus, the lift arm mounting point 7 is provided by said two ears of the side plates 11. In alternative embodiments, the lift arm may be connected to the central structure of the frame 3. The frame end of the main hydraulic cylinder 8 is located below the first pivot connection 7 at which the lift arm 6 is pivotally connected to the side plates 11. Thus, when the lift arm 6 is its lower end position, major parts of the lift arm 6 and the main hydraulic cylinder 8 are positioned between the side plates 11. The main hydraulic cylinder 8 is arranged in a so called high-mount design. Thus when the lift arm 6 is in its lower end position, the frame end of the main hydraulic cylinder 8 is higher than the lift arm end 802 of the main hydraulic cylinder 8.

In should be noted that the side plates 11 may be provided from a single work piece, such as a steel plate of a suitable thickness. The side plates may be reinforced as required. In alternative embodiments each side plate 11 may be formed by two or more portions which are joined, e.g. by welding. For example, the lower part of each side plate 11 may be provided from a steel plate of a certain thickness, while the upper part of each side plate 11, with the side plate ear 1101, may be provided from a work piece of another thickness.

The wheel loader from unit 102 further comprises two hub supporting elements 12. Each hub supporting element 12 is arranged outside of a respective of the side plates 11, and thereby mounted to the respective side plate 11, e.g. by welding. The hub supporting elements 12 supports a respective of the hub units 13. The hub units 13 are located outside of the hub supporting elements. Thus, the frame 3, the lift arm 6 and the main hydraulic cylinder 8 are located centrally between the hub supporting elements 12.

The hub supporting elements 12 have an elongated shape and extend in the direction of straight travel of the wheel loader. Each hub unit 13 is mounted to the forward end of the respective hub supporting element 12. The respective hub supporting element 12 has a circularly shaped interface 1201 for mating with the hub unit 13. The from wheel axis 108 extends through the center of the interface 1201. Thereby, the hub supporting elements 12 define with their design and their position on the frame 3 the position of the front wheel axis 108. The elongated shape of the hub supporting elements 12 support the structural properties of the front unit 102. The hub supporting elements may house wheel loader components, such as hydraulic components, e.g. hydraulic conduits.

The front unit further comprises two slave hydraulic cylinders 10, the functions of which are described below with reference to FIG. 3. Each slave hydraulic cylinder 10 extends between the lift arm 6 and a respective of the hub supporting elements 12. Each slave hydraulic cylinder 10 is pivotally connected to the respective hub supporting element 12 at a respective first mounting point 1001 and to the lift arm 6 at a respective second mounting point 1002. For this, the hub supporting elements 12 are provided with ears for the connection to the slave hydraulic cylinders 10. The first and second mounting points 1001, 1002 provide respective pivot connections of the respective slave hydraulic cylinder 10 to the respective hub supporting element 12 and of the respective slave hydraulic cylinder 10 to the lift arm 6.

Each slave hydraulic cylinder 10 is pivotally connected to the lift arm 6 on a respective lateral side of the lift arm 6. Herein a lateral direction is understood as a horizontal direction which is perpendicular to the direction of straight travel of the wheel loader when the wheel loader is supported on a horizontal surface. Each slave hydraulic cylinder 10 is pivotally connected to the respective hub supporting element 12 on a lateral side of the lift arm, which is the same as the lateral side on which the respective slave hydraulic cylinder 10 is pivotally connected to the lift arm; i.e. the slave hydraulic cylinders 10, as projected on a vertical lateral plane extending transversely to the direction of straight travel of the wheel loader, do not intersect.

The distance between the second mounting point 1002 and the first pivot connection 7, which connects the lift arm 6 to the central structure 5 of the frame 3, is shorter than the distance between the first mounting point 1001 and the first pivot connection 7. Each slave hydraulic cylinder 10 comprises a cylinder portion 1003 and a piston portion 1004 which are movable in relation to each other along an actuation direction of the slave hydraulic cylinder 10. The cylinder portion 1003 is pivotally connected to the hub supporting element 12 and the piston portion 1004 is pivotally connected to the lift arm 6.

It is understood that the single main hydraulic cylinder 8 is located laterally between the slave hydraulic cylinders 10. The single lift arm 6 is located laterally between the slave hydraulic cylinders 10. The frame 3 is located laterally between the slave hydraulic cylinders 10.

Figure 2B:
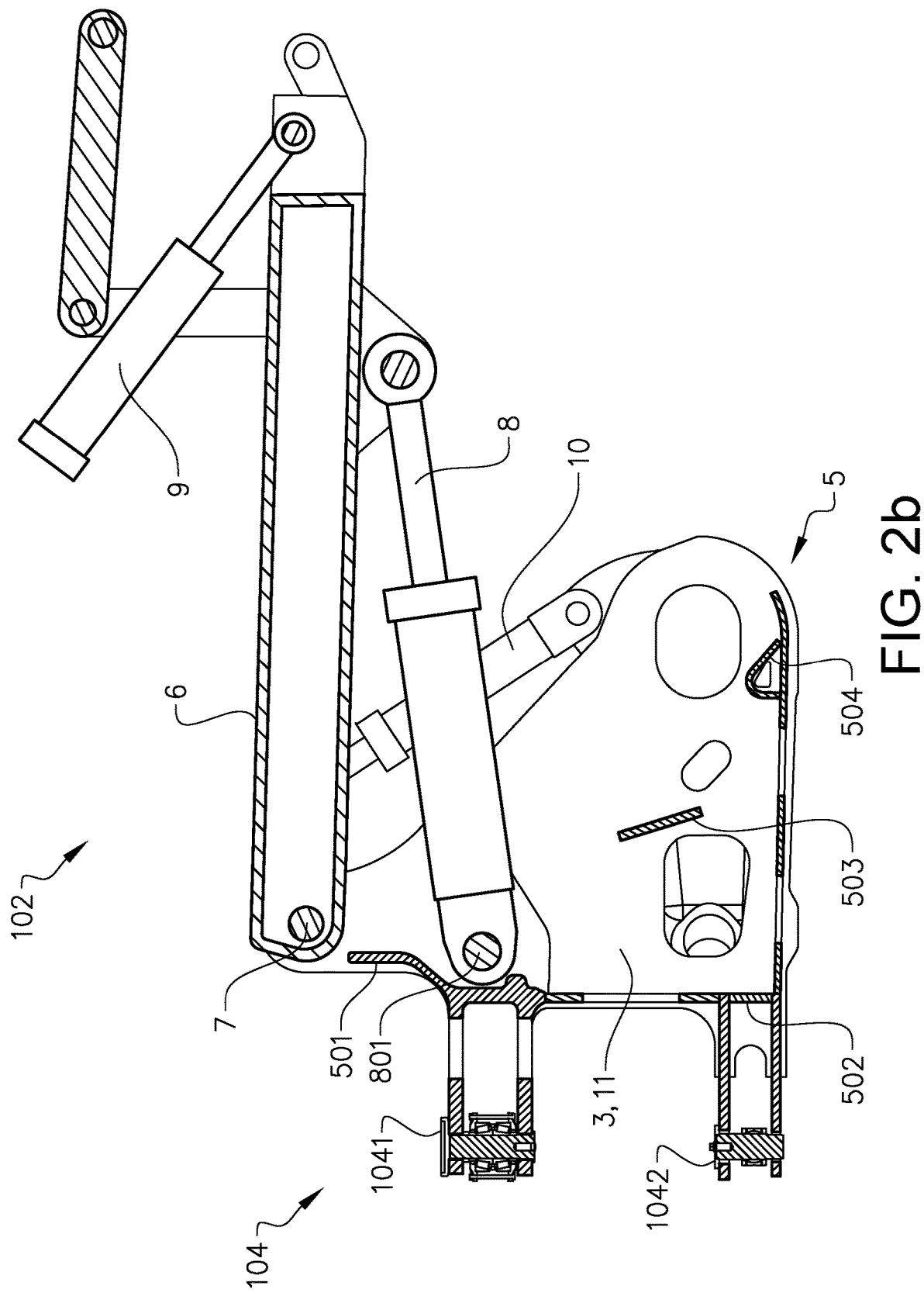
FIG. 2b shows a sectioned side view of the front unit in FIG. 2.

As can be seen from the cut view in FIG. 2b, the central structure 5 comprises an upper central member 501 located at an upper joint element 1041 of the pivotable coupling 104 described further below. The central structure 5 further comprises a lower central member 502 located at a lower joint element 1042 of the pivotable coupling 104. In addition, the central structure 5 comprises a front central member 504 located between the hub supporting elements 12. Further, the central structure comprises a further central element 503 located above the front central member 504. It is understood that the central structure may be provided in alternative manners. For example, instead to being provided in the form of separate members, 501, 502, 503, 504, the central structure 5 may be provided as a single member connecting the side plates 11.

Figure 3:
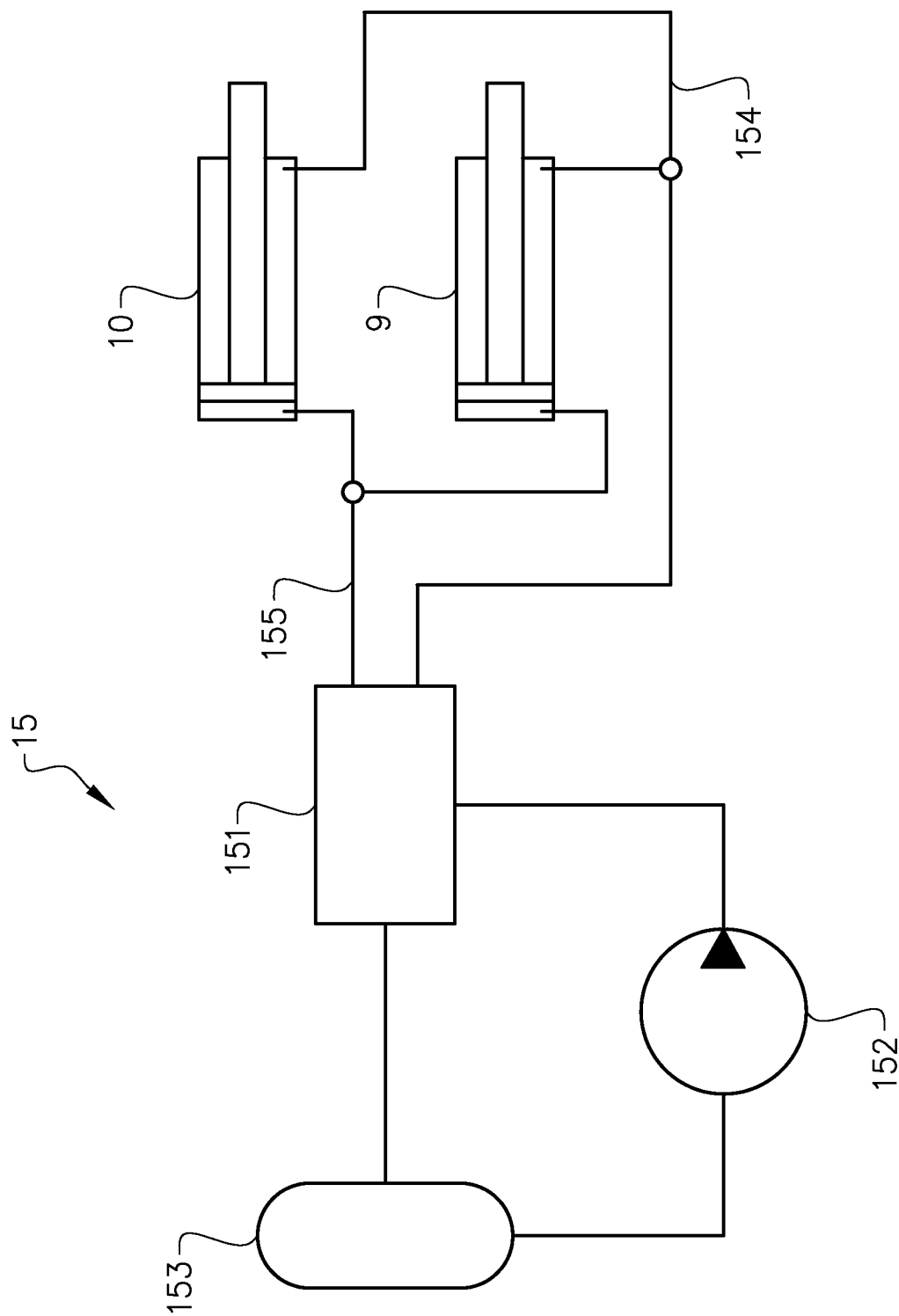
FIG. 3 is a diagram of a part of a hydraulic system in the wheel loader in FIG. 1.

Reference is made to FIG. 3. The hydraulic system 15 of the wheel loader serves as mentioned the main hydraulic cylinder 8, which however is not shown in FIG. 3. FIG. 3 shows one of the slave hydraulic cylinders 10 and the tilting hydraulic cylinder 9. The other of the slave hydraulic cylinders 10 is hydraulically connected as the slave hydraulic cylinder shown in FIG. 3. The slave hydraulic cylinders 10 and the hydraulic cylinder 9 are connected to a valve 151 of the hydraulic system 15, which valve 151 is used to control the flow of hydraulic fluid pumped by a hydraulic pump 152 and stored in a hydraulic tank 153, as is known per se. Thereby, the implement 14 (FIG. 1) may be tilted by actuation of the tilting hydraulic cylinder 9 by a control action of an operator of the wheel loader, via a control unit (not shown).

In addition, the slave hydraulic cylinders 10 are hydraulically connected to the tilting hydraulic cylinder 9 for controlling the tilting movement of the implement when the lift arm 6 (FIG. 2) is pivoted by means of the main hydraulic cylinder 8. More specifically, when the lift arm 6 is raised or lowered, the slave cylinders 10 are extended and contracted, respectively, and by means of the connections with the tilting hydraulic cylinder 9, the tilting hydraulic cylinder 9 will "follow" the lift arm movement, and actuate the implement 14 so that the angular position of the implement 14 relative to the ground remains substantially constant when the lift arm is moved.

For this, a piston rod side of the respective slave hydraulic cylinder 10 is hydraulically connected via a respective first hydraulic conduit 154 to a piston rod side of the tiling hydraulic cylinder 9, and a piston side of the respective slave hydraulic cylinder 10 is hydraulically connected via a respective second hydraulic conduit 155 to a piston side of the tiling hydraulic cylinder 9. When the lift arm 6 (FIG. 2) is raised, the slave hydraulic cylinders 10 are extended, whereby hydraulic fluid is moved via the first hydraulic conduits 154 from the piston rod sides of the slave hydraulic cylinders 10 to the piston rod side of the tiling hydraulic cylinder 9, and hydraulic fluid is moved via the second hydraulic conduits 155 from the piston side of the tiling hydraulic cylinder 9 to the piston sides of the slave hydraulic cylinders 10. Thereby, the tiling hydraulic cylinder 9 is contracted while lift arm 6 is raised, so that the implement remains in a constant angular position relative to the ground.

Correspondingly, when the lift arm 6 (FIG. 2) is lowered, the slave hydraulic cylinders 10 are contracted, whereby hydraulic fluid is moved via the first hydraulic conduits 154 from the piston rod side of the tiling hydraulic cylinder 9 to the piston rod sides of the slave hydraulic cylinders 10, and hydraulic fluid is moved via the second hydraulic conduits 155 from the piston sides of the slave hydraulic cylinders 10 to the piston side of the tiling hydraulic cylinder 9. Thereby, the tiling hydraulic cylinder 9 is extended while lift arm 6 is lowered, so that the implement remains in a constant angular position relative to the ground.

By extending between the lift arm 6 and the hub supporting elements 12 the slave cylinders 10 are arranged to transfer forces directly between the lift arm 6 and the hub supporting elements 12. Thus, the frame 3, including the side plates 11, is advantageously by-passed, whereby the frame 3 does not have to be structurally designed to to manage all loads acting from the lift arm.

Figure 4:
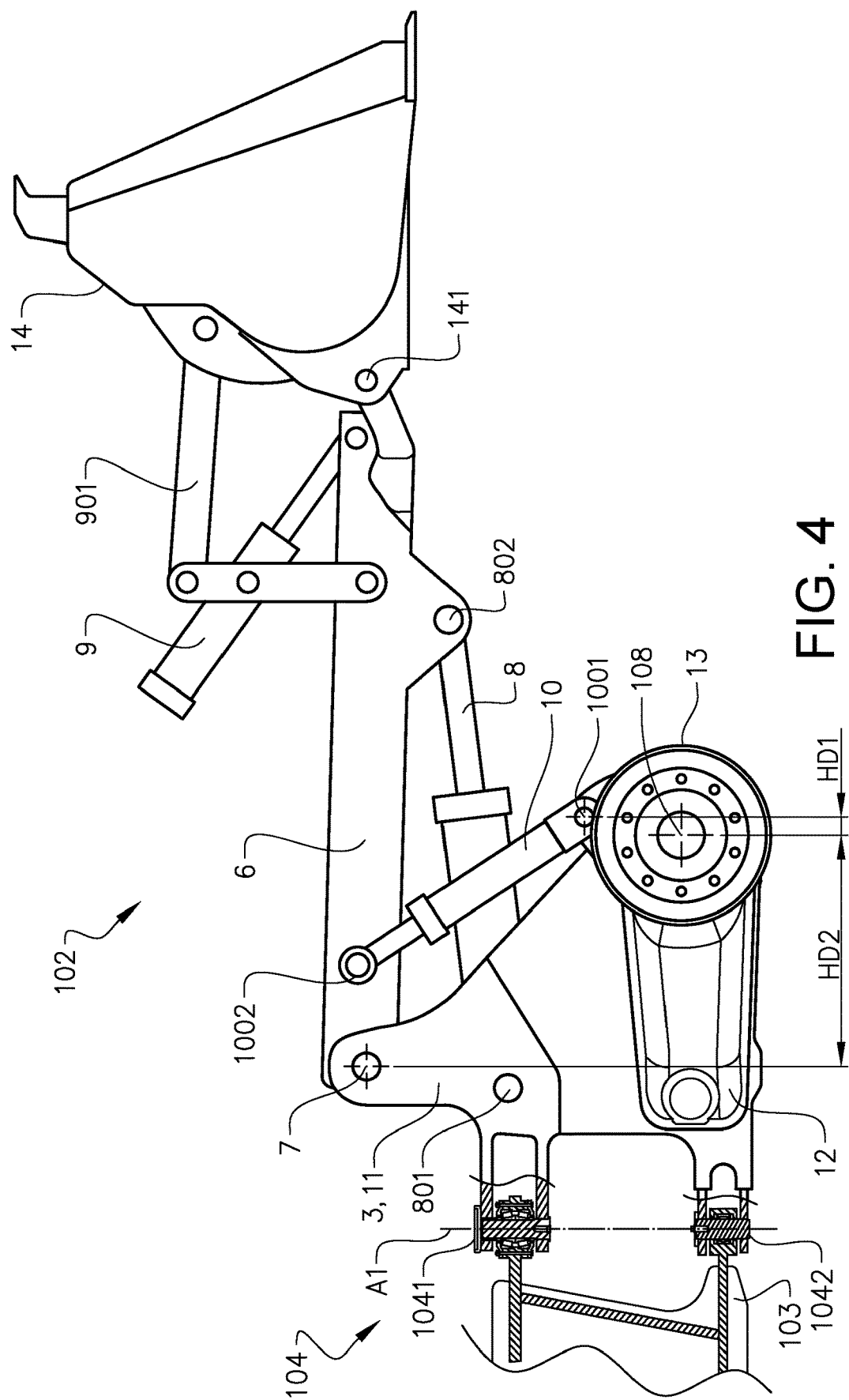
FIG. 4 is a side view of the front unit in FIG. 2.

Reference is made to FIG. 4, showing a side view of the front unit 102 with the implement 14 pivotally connected at the second pivot connection 141 of the second end of the lift arm 6, and the main hydraulic cylinder 8 with the frame end 801 pivotally connected to the frame 3, and the lift arm end 802 pivotally connected to the lift arm 6.

As can be seen, the first mounting point 1001, at which the respective slave hydraulic cylinder 10 is pivotally connected to the respective hub supporting element 12, is in the vicinity of the front wheel axis 108. The first mounting points 1001 are located above the front wheel axis 108. Further the first mounting points 1001 are located in front of the front wheel axis 108 in the direction of straight travel of the wheel loader. In the example embodiment, a ratio between a horizontal distance HD1, between the front wheel axis 108 and the first mounting points 1001, and a horizontal distance HD2, between the front wheel axis 108 and the first pivot connection 7 of the lift arm 6 to the frame 3, is approximately 10%.

As mentioned the pivotable coupling 104 connecting the front unit 102 and the rear unit 103 comprises the upper joint element 1041 and the lower joint element 1042 connecting the frame 3 to the rear unit 103. Thereby, the front and rear units 102, 103 are pivotable in relation to each other around a substantially vertical axis A1 when the wheel loader is supported on a horizontal surface. As can be seen in FIG. 4, the lift arm mounting point 7 is located closer to the upper joint element 1041 than to the lower joint element 1042. Further, also the actuator mounting point 801 is located closer to the upper joint element 1041 than to the lower joint element 1042.

Figure 5:
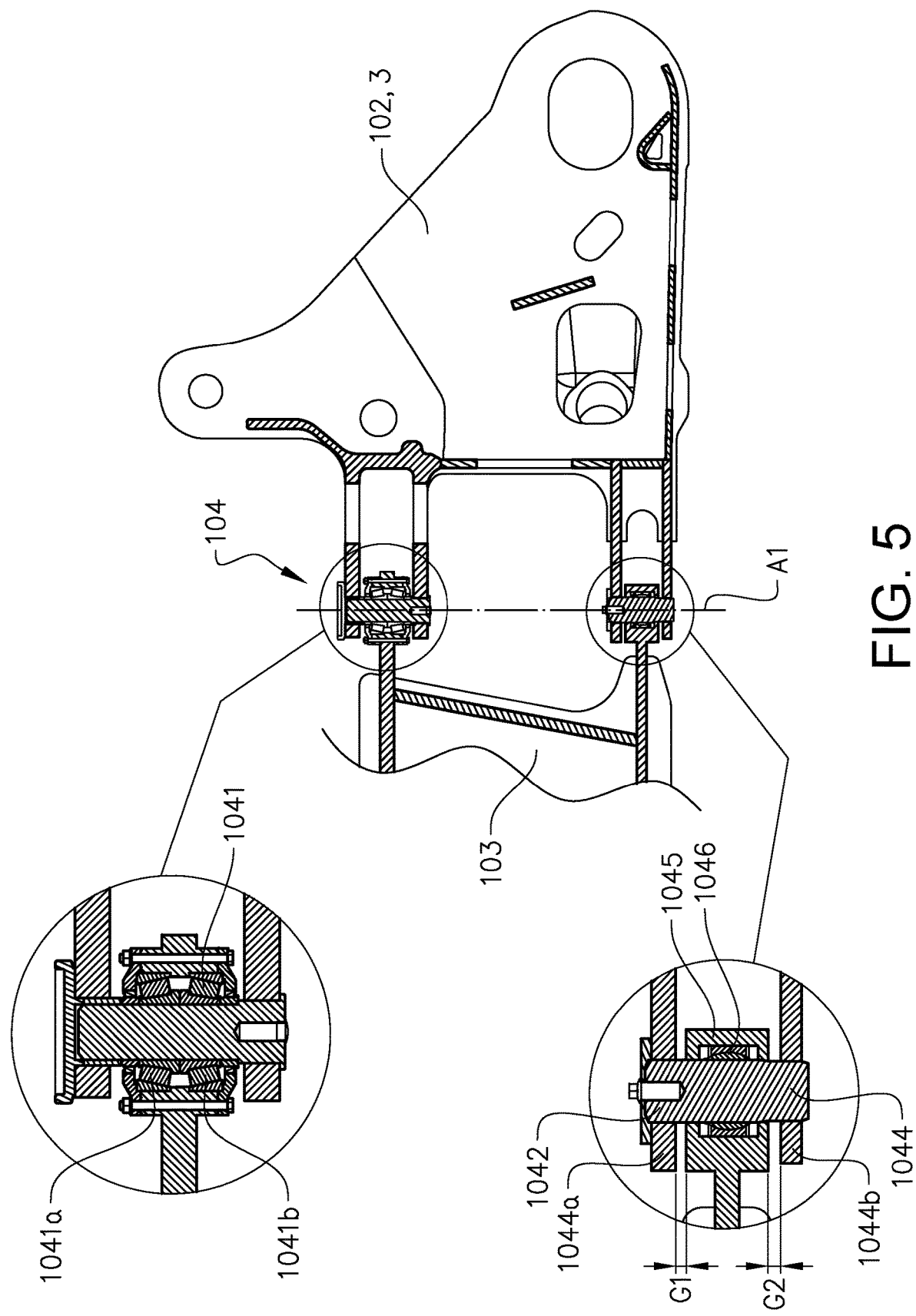
FIG. 5 shows a cross-section of a portion of the front unit in FIG. 4.

Reference is made to FIG. 5. The upper joint element 1041 comprises two conical roller bearings 1041a, 1041b by means of which the upper joint element 1041 is arranged to transfer vertical as well as horizontal loads.

The lower joint element 1042 comprises a cylindrical body 1044 in the form of a pin with a cylinder axis arranged to be coaxial with said substantially vertical axis A1 of the pivotable coupling 104. The cylindrical body 1044 is fixed to the frame 3 via an upper and a lower fixing bracket 1044a, 1044b. The lower joint element also comprises an ear 1045 circumventing the cylindrical body 1044. More specifically, the ear 1045 has a tubular shape enclosing the cylindrical body 1044 with a close fit. The ear is fixed to the rear unit 103 and is located between the upper and lower fixing brackets 1044a, 1044b. The ear 1045 comprises a spherical slide bearing 1046 for the pivoting of the front unit 102 in relation to the rear unit 103 around the vertical axis A1.

The ear 1045 is allowed to move in relation to the cylindrical body 1044 along, the cylinder axis of the cylindrical body. For this, the lower joint element 1042 presents an upper gap G1 and a lower gap G2 between the ear 1045 and the upper and lower fixing brackets 1044a, 1044b, respectively. Thereby, it is secured that the lower joint element 1042 will not transfer any substantial portion of the vertical load between the front and rear units 102, 103, and that substantially the entire vertical load is transferred through the upper joint element 1041.

In alternative embodiments, the cylindrical body 1044 may be fixed to the rear unit 103 and the ear may be fixed to the frame 3.

Figure 6:
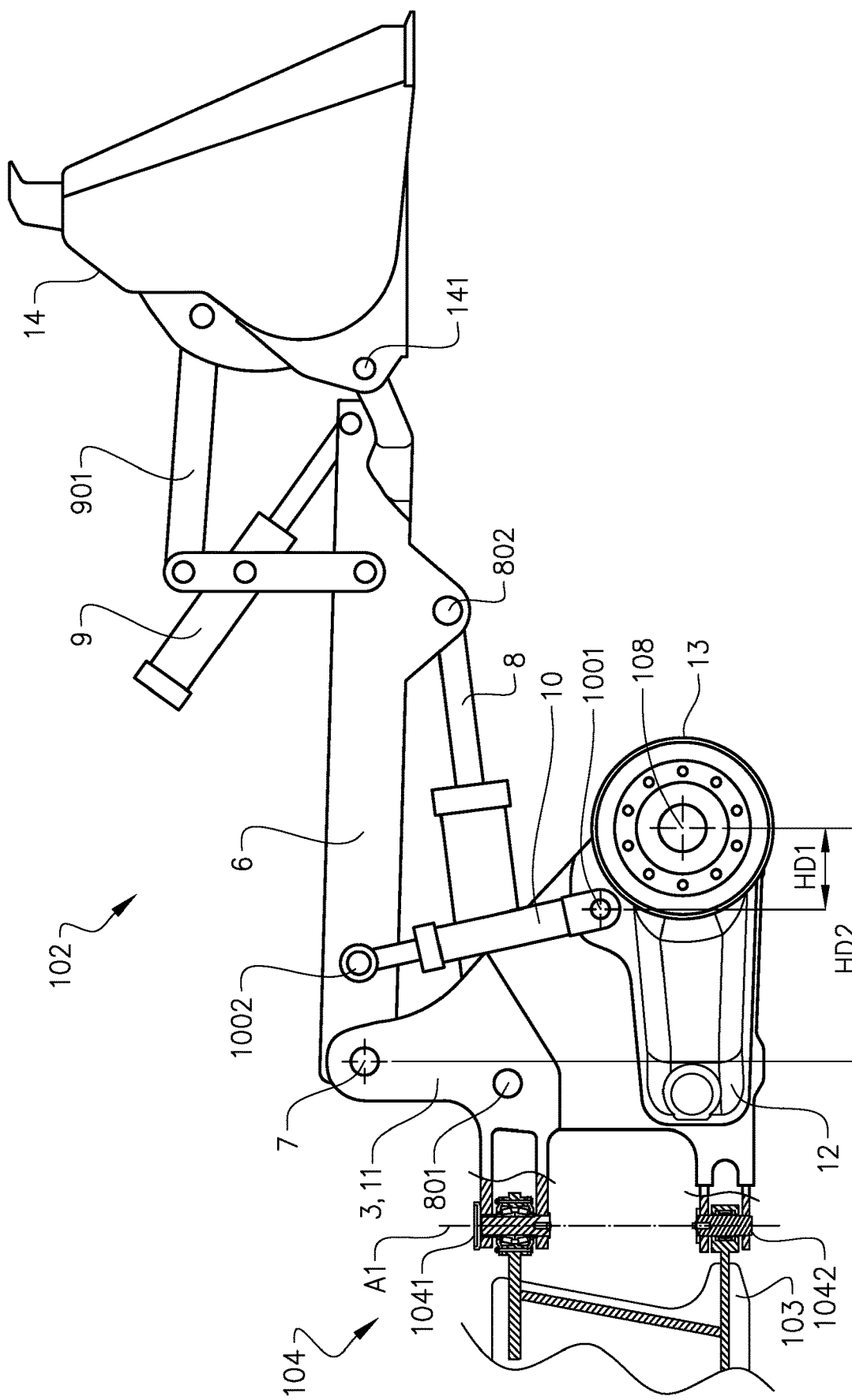
FIG. 6 is a schematic side view of a front unit according to an alternative embodiment of the invention.

FIG. 6 shows a schematic side view of a front unit 102 according to an alternative embodiment of the invention. This embodiment shares most of the features of the embodiment described above with reference to FIG. 1-4. However, differing from the embodiment described above, the first mounting points 1001 of the slave hydraulic cylinders 10 to the hub supporting elements 12 are located behind the front wheel axis 108 with respect to the direction of straight travel of the wheel loader. The ratio between the horizontal distance HD1, between the front wheel axis 108 and the first mounting points 1001, and a horizontal distance HD2, between the front wheel axis 108 and the first pivot connection 7 of the lift arm 6 to the frame 3, is approximately 24%.

It is to be understood that the present invention is not limited to the embodiments described above and illustrated in the drawings; rather, the skilled person will recognize that many changes and modifications may be made within the scope of the appended claims.

The invention claimed is:

1. A wheel loader front unit comprising a frame for a wheel loader,
the frame comprising an upper joint element and a lower joint element for connecting the frame to a rear unit of the wheel loader, and for transferring loads between the frame and the rear unit,
the frame comprising a lift arm mounting point for a pivot connection of the frame and a lift arm for lifting an implement of the wheel loader,
wherein the upper and lower joint elements are arranged so that a first of the upper and lower joint elements, during use of the wheel loader, transfers a larger vertical load than a second of the upper and lower joint elements, and
the lift arm mounting point is located closer to the first of the upper and lower joint elements than to the second of the upper and lower joint elements, wherein the wheel loader front unit comprises two hub supporting elements, each hub supporting element being arranged on opposite sides outside of the frame for supporting a respective hub unit, the wheel loader front unit comprising the lift arm, the lift arm being arranged to be pivoted around the pivot connection to the frame by means of a main hydraulic cylinder, the wheel loader front unit further comprising a tilting hydraulic cylinder arranged to actuate a tilting movement of the implement in relation to the lift arm, the wheel loader front unit further comprising a slave hydraulic cylinder hydraulically connected to the tilting hydraulic cylinder for controlling the tilting movement of the implement when the lift arm is pivoted by means of the main hydraulic cylinder, wherein the slave hydraulic cylinder extends between the lift arm and one of the hub supporting elements.

2. A wheel loader front unit according to claim 1, wherein the upper and lower joint elements are arranged so that the first of the upper and lower joint elements, during use of the wheel loader, transfers substantially an entire vertical load between the frame and the rear unit.

3. A wheel loader front unit according to claim 1, wherein the frame comprises an actuator mounting point for a pivot connection of the frame and the main hydraulic cylinder, the actuator mounting point being located closer to the first of the upper and lower joint elements than to the second of the upper and lower joint elements.

4. A wheel loader front unit according to claim 1, wherein the upper joint element is the first of the upper and lower joint elements and the lower joint element is the second of the upper and lower joint elements.

5. A wheel loader front unit according to claim 4, wherein the wheel loader front unit comprises the lift arm and the main hydraulic cylinder for pivoting the lift arm around a horizontal axis at the lift arm mounting point, and that a frame end of the main hydraulic cylinder, which is connected to the frame at an actuator mounting point, is situated higher than a lift arm end of the main hydraulic cylinder, which is connected to the lift arm, when the wheel loader front unit forms a part of a wheel loader and the lift arm is situated in its lowest position.

6. A wheel loader front unit according to claim 1, wherein the upper and lower joint elements are arranged to connect the frame to the rear unit so as to allow the front and rear units to pivot in relation to each other around a substantially vertical axis when the wheel loader is supported on a horizontal surface, and the second of the upper and lower joint elements comprises a cylindrical body connectable to one of the frame and rear unit, with a cylinder axis arranged to be coaxial with the substantially vertical axis, and an ear connectable to the other of the frame and rear unit, arranged to circumvent the cylindrical body, wherein the second of the upper and lower joint elements is arranged to allow the ear to move in relation to the cylindrical body along the cylinder axis of the cylindrical body.

7. A wheel loader front unit according to claim 1, wherein the slave hydraulic cylinder is pivotally connected to the hub supporting element at a first mounting point and to the lift arm at a second mounting point.

8. A wheel loader front unit according to claim 7, wherein the hub supporting elements define a position of a wheel axis, and the first mounting point is in a vicinity of the wheel axis.

9. A wheel loader front unit according to claim 7, wherein the hub supporting elements define a position of a wheel axis, and the first mounting point is located above the wheel axis when the wheel loader front unit forms a part of a wheel loader and the wheel loader is supported on a horizontal support surface.

10. A wheel loader front unit according to claim 7, wherein the hub supporting elements define a position of a wheel axis, and a ratio between a horizontal distance between the wheel axis and the first mounting point and a horizontal distance between the wheel axis and the pivot connection of the lift arm to the frame is less than 30%, where the horizontal distances are measured along a longitudinal axis being parallel to a direction of straight travel of the wheel loader when the wheel loader front unit forms a part of the wheel loader.

11. A wheel loader front unit according to claim 1, wherein the wheel loader front unit comprises two slave hydraulic cylinders each extending between the lift arm and a respective of the hub supporting elements.

12. A wheel loader front unit according to claim 1, wherein the frame comprises two side plates and an intermediate central structure connecting the side plates to each other.

13. A wheel loader front unit according to claim 12, wherein the two hub supporting elements are arranged outside of respective ones of the side plates.

14. A wheel loader front unit according to claim 12, wherein the wheel loader front unit comprises the lift arm, wherein the lift arm is arranged to be pivotable to a position where at least a major part of the lift arm is positioned between the side plates.

15. A wheel loader front unit according to claim 1, wherein the lift arm is located centrally between the hub supporting elements.

16. A wheel loader front unit according to claim 1, wherein the main hydraulic cylinder is located centrally between the hub supporting elements.

17. A wheel loader front unit according to claim 1, wherein each hub unit comprises a hub motor for propulsion of the wheel loader.

18. A wheel loader comprising a wheel loader front unit according to claim 1.

* * * * *